United States Patent
Pakhomov et al.

(10) Patent No.: US 10,892,912 B2
(45) Date of Patent: Jan. 12, 2021

(54) OPTIMIZATION OF NETWORK DATA TRANSFERS OVER A WIDE AREA NETWORK

(71) Applicant: EMC IP Holding Company LLC, Hopkinton, MA (US)

(72) Inventors: Andrey Pakhomov, St-Petersburg (RU); Ivan Andreyev, St-Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 843 days.

(21) Appl. No.: 15/208,870

(22) Filed: Jul. 13, 2016

(65) Prior Publication Data
US 2017/0187548 A1 Jun. 29, 2017

(30) Foreign Application Priority Data
Dec. 23, 2015 (RU) ................. 2015155281

(51) Int. Cl.
*G06F 16/16* (2019.01)
*H04L 12/46* (2006.01)
(Continued)

(52) U.S. Cl.
CPC ........ *H04L 12/4633* (2013.01); *H04L 41/046* (2013.01); *H04L 67/02* (2013.01);
(Continued)

(58) Field of Classification Search
CPC ... H04L 12/4633; H04L 41/046; H04L 67/02; H04L 67/10; H04L 67/2819; H04L 67/42; H04L 69/22; H04L 69/326
See application file for complete search history.

(56) References Cited

U.S. PATENT DOCUMENTS

2002/0129243 A1* 9/2002 Nanjundiah ........ H04L 63/0428
  713/160
2013/0185428 A1* 7/2013 Houghton ............... H04L 69/40
  709/225
(Continued)

OTHER PUBLICATIONS

He, Eric, et al. "Reliable Blast UDP: Predictable High Performance Bulk Data Transfer." Proceedings of IEEE Cluster Computing, Chicago, Illinois, Sep. 2002. [obtained electronically. URL: https://www.evl.uic.edu/cavern/papers/cluster2002.pdf] (Year: 2002).*

*Primary Examiner* — John B Walsh
(74) *Attorney, Agent, or Firm* — Ryan, Mason & Lewis, LLP (57) ABSTRACT

Methods and apparatus are provided for transmitting data over a network through a tunnel. In one embodiment, a method comprises obtaining data for transfer over a network from a sender to a receiver. At an operating system level, at least one packet is intercepted from the data that satisfies one or more configurable criteria. A tunnel is established from the sender to the receiver, wherein the tunnel selectively performs one or more of encryption, compression, and data deduplication of the intercepted packet. The intercepted packet is transmitted through the tunnel from the sender to the receiver. A handshake protocol optionally determines the presence of agents at the sender and receiver. The handshake protocol fails if agents are not present at both the sender and receiver, and the transfer is then carried out over a standard communication channel.

20 Claims, 5 Drawing Sheets

(51) Int. Cl.
*H04L 12/24* (2006.01)
*H04L 29/08* (2006.01)
*H04L 29/06* (2006.01)
*G06F 15/16* (2006.01)

(52) U.S. Cl.
CPC .......... *H04L 67/10* (2013.01); *H04L 67/2819* (2013.01); *H04L 67/42* (2013.01); *H04L 69/22* (2013.01); *H04L 69/326* (2013.01)

(56) References Cited

U.S. PATENT DOCUMENTS

2014/0351447 A1* 11/2014 Annamalaisami ........................... H04L 65/1069
709/227
2017/0149738 A1* 5/2017 Zheng .................... H04L 69/16

* cited by examiner

OPTIMIZATION OF NETWORK DATA TRANSFERS OVER A WIDE AREA NETWORK

FIELD

The field relates generally to data transmission, and, more particularly, to improved techniques for transferring data over a network, such as a wide area network (WAN).

BACKGROUND

Data upload and download to a cloud have become critical tasks, with increasing amounts of transmitted data and channels with limited bandwidth. Standard communications use existing protocols, such as REST (Representational State Transfer) and HTTP (Hypertext Transfer Protocol), on top of TCP (Transmission Control Protocol). TCP is not optimal for transferring large files over a network, as transfer speeds decrease when latency and/or packet loss rates are high as a result of, for example, distance, poor network conditions, and/or congestion. Any application relying on this data transfer also suffers. A number of techniques have been proposed or suggested to improve data throughput using more efficient transfer protocols, but these techniques require the application to be modified or perform additional work (which may not be possible in some cases).

A need therefore exists for improved techniques for transferring large amounts of data over a network using a more efficient transfer protocol, relative to existing protocols, without requiring modification of existing applications.

SUMMARY

Illustrative embodiments of the present invention provide methods and apparatus for transmitting data over a network through a tunnel. In one embodiment, a method is provided comprising the steps of obtaining data for transfer over a network from a sender to a receiver; intercepting, at an operating system level, at least one packet of the data that satisfies one or more configurable criteria; establishing a tunnel from the sender to the receiver, wherein the tunnel selectively performs one or more of encryption, compression, and data deduplication of the at least one intercepted packet; and transmitting the at least one intercepted packet through the tunnel from the sender to the receiver.

In one or more exemplary embodiments, a first agent located at the sender and a second agent located at the receiver are used to establish and maintain the tunnel. The presence of both the first agent and the second agent may be determined utilizing a handshake protocol. The handshake protocol fails if the first agent or the second agent is not present, and the transfer is carried out over a standard communication channel.

In at least one embodiment, substantially all packets from the data are transmitted through the tunnel, and the tunnel is maintained for the duration of the transfer.

As noted above, illustrative embodiments described herein provide significant improvements relative to conventional techniques for transferring large quantities of data over a network. In one or more embodiments, data packets are transferred using a protocol that is more efficient and/or more secure.

DETAILED DESCRIPTION

Illustrative embodiments of the present invention will be described herein with reference to the transmission of data over a network utilizing a tunnel from a sender to a receiver. It is to be appreciated, however, that the invention is not restricted to use with the particular illustrative configurations shown. Aspects of the invention provide methods and apparatus for enhanced transfer of data over a network utilizing a tunnel to transmit data from a sender to a receiver based on given criteria of the data. Accordingly, the terms "tunnel," "network," "sender," and "receiver," as used herein, are intended to be broadly construed.

As will be described, the present invention in one or more illustrative embodiments provides techniques for transferring data over a network through a tunnel, based on configurable criteria, such as characteristics of the data. In one or more exemplary embodiments, data to be transferred over a network from a sender to a receiver is obtained, and at least one packet from the data is intercepted at an operating system level when the data satisfies the configurable criteria.

In one or more exemplary embodiments, a tunnel is established between the sender and the receiver to transmit the intercepted packet. The tunnel performs one or more of encryption, compression, and data deduplication of the intercepted packet to improve the transmission of the intercepted packet over the network. The intercepted packet is then transmitted through the tunnel from the sender to the receiver. For example, an application can selectively enable one or more of encryption, compression, and data deduplication for the transmission of packets using a library. According to one aspect of the invention, the encryption, compression, and/or data deduplication can be configured in a network packet filter. In this manner, data packets are transferred using a protocol that is more efficient and/or more secure.

In one or more exemplary embodiments, the criteria for intercepting packets comprise configurable parameters. An exemplary set of configurable parameters is discussed further below in conjunction with FIG. 4. For example, configurable parameters for intercepting packets comprise one or more of a given transmission protocol port, a given source Internet Protocol (IP) address, a given destination IP address, a given encryption type, a given mask, and a given application type.

In one exemplary embodiment, encryption, data deduplication and compression are provided by a library integrated into an application, such as the EMC WAN Optimization Components Library (EWOC) software package from EMC Corp. According to a further aspect of the invention, the EWOC library provides an operating system level feature comprising a network tunnel that is transparent to the application.

Aspects of the present invention recognize that a number of efficient transfer protocols may provide enhanced reliability and transmission speed over traditional protocols, such as TCP. As noted above, existing data transmission techniques use existing protocols, such as REST and HTTP/HTTPS, on top of TCP. For example, the BURST transmission protocol from EMC Corp. is a transport protocol for efficient WAN data transfers that comprises an effective large data transmission protocol built on top of User Datagram Protocol (UDP) as a TCP replacement. "BURST" is a recursive acronym for "BURST is UDP Reliable Simultaneous Transactions."

Accordingly, an EWOC tunnel or another transmission tunnel from a sender to a receiver may transparently use the BURST protocol as a replacement transfer protocol, thus requiring no modification to the application server. For a more detailed discussion of the BURST transmission protocol, see, for example, U.S. patent application Ser. No. 15/208,874(now U.S. Pat. No. 10,148,548), filed Jul. 13, 2016, entitled "Connection-Oriented Communication Devices With Round Trip Time Estimation," incorporated by reference herein.

Figure 1:
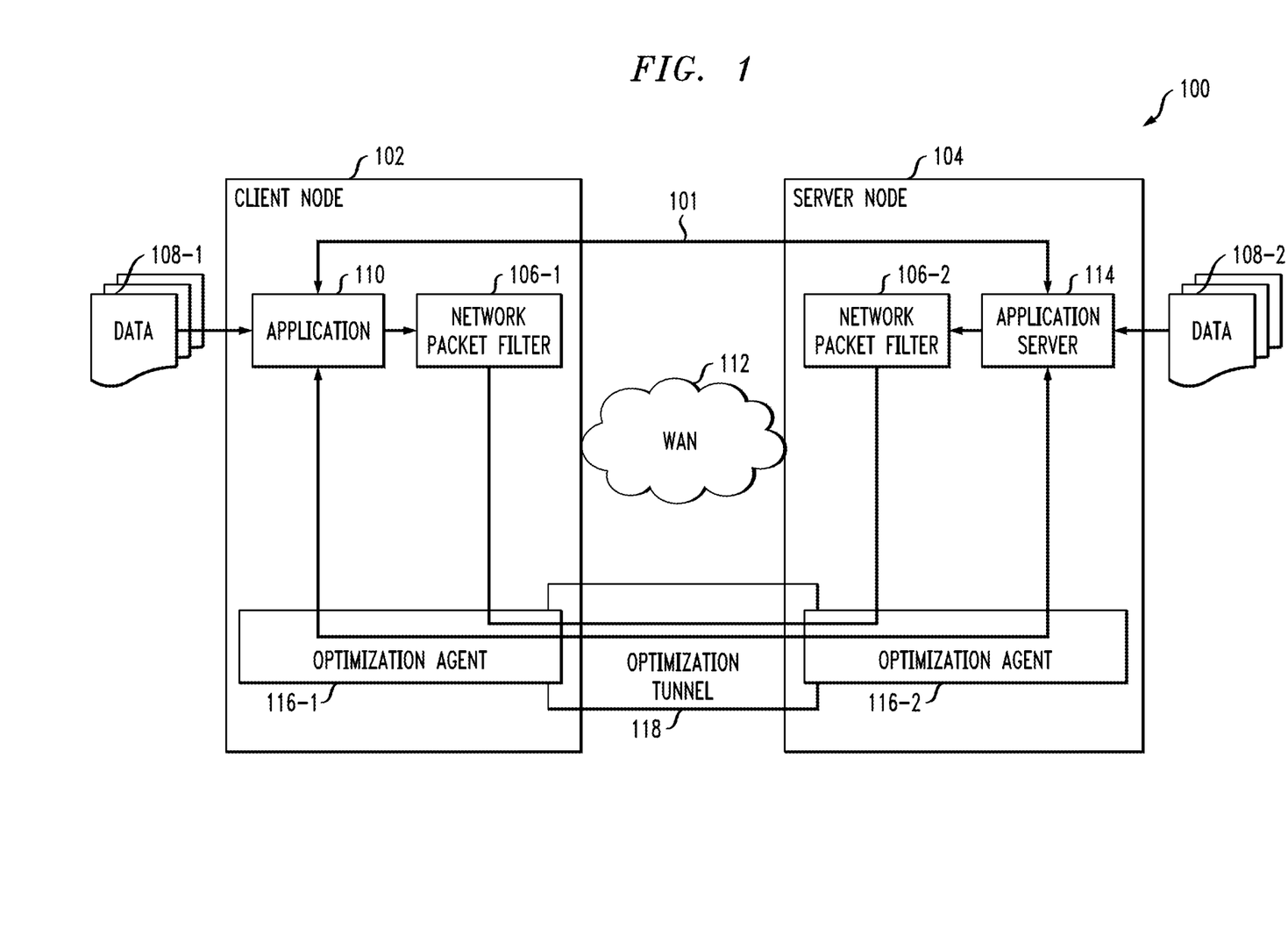
FIG. 1 illustrates an exemplary network communication environment incorporating aspects of the present invention.

FIG. 1 illustrates an exemplary network communication environment 100 incorporating aspects of the present invention. As shown in FIG. 1, client node 102 and server node 104 are connected via a network, such as WAN 112. An application 110 executing on client node 102 can transfer data 108-1 to an application server 114 executing on server node 104 over WAN 112, using a transfer protocol 101, in a known manner. Standard transfer protocols include REST, HTTP, and HTTPS, which operate on top of TCP.

In order to transfer packets of data that meet certain criteria, a network packet filter, such as network packet filter 106-1 on client node 102 or network packet filter 106-2 on server node 104, intercepts at least one packet from the existing exchange protocol 101. An optimization agent 116, such as optimization agents 116-1 and 116-2 on client node 102 and server node 104, respectively, establishes and maintains a tunnel, such as optimization tunnel 118, between client node 102 and server node 104. The optimization agent 116-1 transfers the intercepted packet(s) through the optimization tunnel 118 to corresponding optimization agent 116-2, which in turn relays the intercepted packet(s) to application server 114 on server node 104. In one or more embodiments, the optimization tunnel 118 is maintained for the duration of the transfer, and substantially all packets from data 108 are transferred through optimization tunnel 118.

In one exemplary embodiment, the network packet filter 106-1 is configured to intercept certain packets of data based on given criteria. Criteria for interception are discussed further below in conjunction with FIG. 4. In one or more embodiments, packet interception is performed at an operating system level. For example, with the Windows™ operating system from Microsoft Corp., the Windows Filtering Platform allows an application (e.g., network packet filters 106) to interact and intercept network packets (from/to the application being optimized) on several layers of the networking stack. The Platform, services, and application programming interfaces (APIs) are provided by the Windows™ operating system. As a further example, with the open source Linux operating system, the Netfilter Framework (and the iptables utility) allows an application (such as network packet filters 106) to implement network packet processing in the form of customized handlers. The Netfilter Framework is a part of the Linux kernel.

In addition, exemplary embodiments provide that characteristics of the optimization tunnel 118 are configured in a network packet filter 106. The characteristics of the optimization tunnel 118 may be configurable by a user. In an alternative embodiment, characteristics of the optimization tunnel 118 may be configured by an application. In yet another embodiment, characteristics of the optimization tunnel 118 may be configured by a network provider. Configurable characteristics of the optimization tunnel 118 may include, for example, encryption, compression, and data deduplication of intercepted packets. For example, encryption may be disabled in optimization tunnel 118 if the packets for transfer are already encrypted or if a user does not wish to encrypt non-sensitive data. As a further example, the optimization tunnel 118 may implement a transfer protocol, such as TCP or BURST, which may be user-selected. Criteria for data transfer in the optimization tunnel 118 are discussed further below in conjunction with FIG. 4.

Additionally, exemplary embodiments provide for substantially transparent packet interception requiring little or no modifications to the application server, such as application server 114. Thus, legacy applications may be enhanced with characteristics such as compression, encryption, and data deduplication without changing the application itself.

Figure 2:
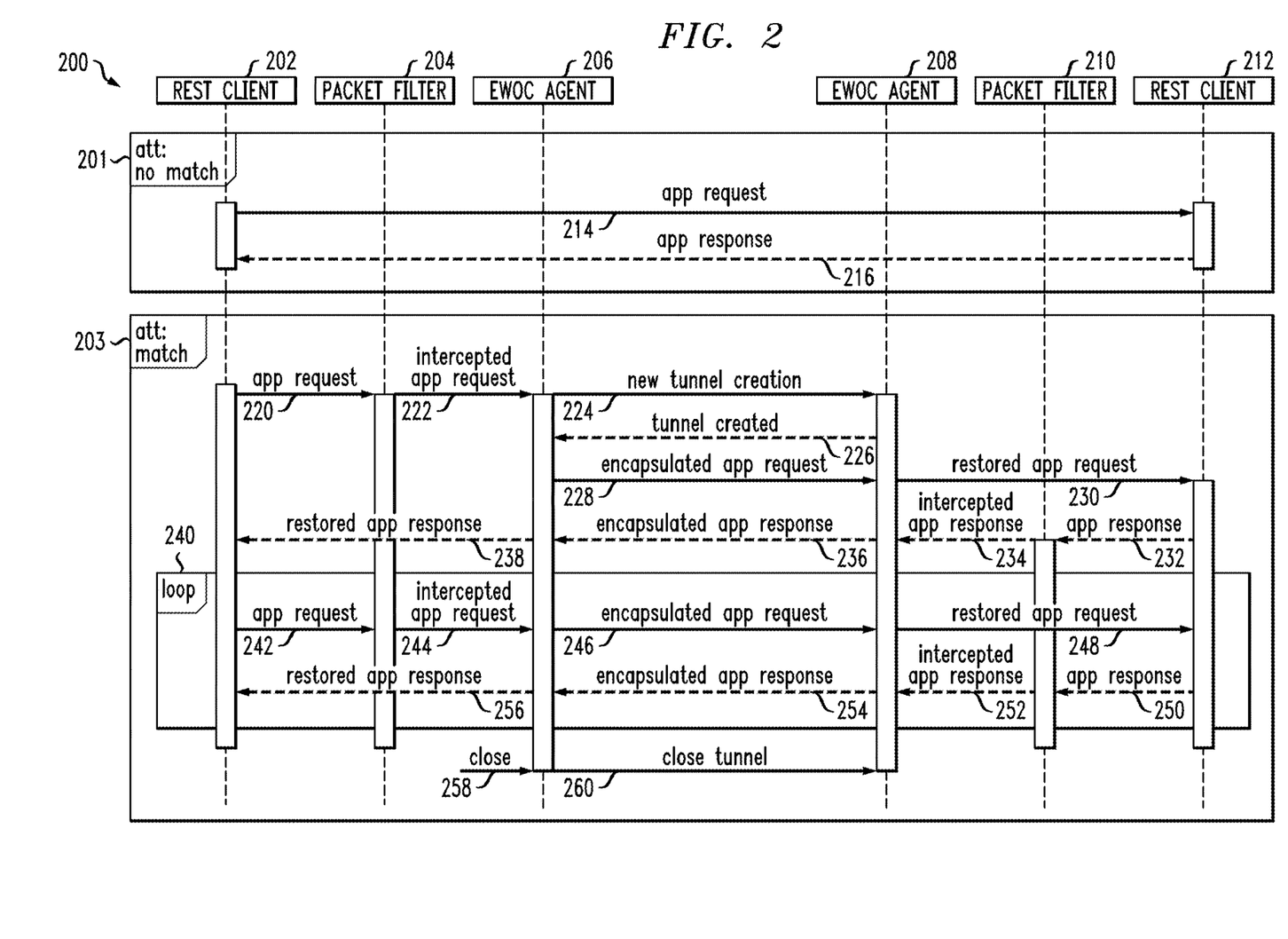
FIG. 2 illustrates exemplary communications in the network communication environment of FIG. 1.

FIG. 2 illustrates exemplary communications 200 in the network communication environment 100 of FIG. 1. As shown in FIG. 2, an exemplary REST client 202, executing, for example, on client node 102, sends an application request 214, 220 to an exemplary REST server 212, executing, for example, on server node 104. As discussed further below in conjunction with FIG. 3, if optimization agents 116-1 and 116-2, such as EWOC agent 206 and EWOC agent 208, are present on both client node 102 and server node 104, the application request 220 will be classified as a "match" 203 and carried over optimization tunnel 118 in accordance with embodiments of the invention. If, however, optimization agents 116-1 and 116-2, such as EWOC agent 206 and EWOC agent 208, are not present on both client node 102 and server node 104, the application request 214 will be classified as "no match" 201 and transmitted using standard protocol 101.

As shown in FIG. 2, when the application request 214 is classified as "no match" 201, the application request 214 is transmitted to the REST server 212 using a standard protocol 101. In addition, the REST server 212 provides an application response 216 to the REST client 202

When the application request 220 is classified as a "match" 203, however, the application request 220 is intercepted and processed by packet filter 204 and the intercepted application request 222 is provided to the EWOC agent 206, for example, on client node 102. The EWOC agent 206 sends a new tunnel creation request 224 to the EWOC agent 208, for example, on server node 104. The EWOC agent 208 then sends a tunnel created confirmation message 226 to the EWOC agent 206.

The EWOC agent 206 send an encapsulated application request 228 to the EWOC agent 208, and the EWOC agent 208 sends a restored application request 230 to the REST server 212. The REST server 212 responds to the packet filter 210 with an application response 232. The packet filter 210 provides an intercepted application response 234 to the EWOC agent 208, and the EWOC agent 208 provides an encapsulated application response 236 to the EWOC agent 206.

The EWOC agent 206 provides a restored application response 238 to the REST client 202. During a loop 240, the REST client 202 provides a further application request 242, which is intercepted by the packet filter 204, which provides the intercepted application request 244 to the EWOC agent 206. The EWOC agent 206 then sends an encapsulated application request 246 over the tunnel 118 to the EWOC agent 208. The EWOC agent 208 provides a restored application request 248 to the REST server 212.

The REST server 212 provides an application response 250, which is intercepted by the packet filter 210. The packet filter 210 provides an intercepted application response 252 to the EWOC agent 208 and the EWOC agent 208 sends an encapsulated application response 254 over the tunnel 118 to the EWOC agent 206. The EWOC agent 206 sends a restored application response 256 to the REST client 202. When all data has been transferred, a close message 258 is sent to the EWOC agent 206, and the EWOC agent 206 sends a close tunnel message 260 to the EWOC agent 208.

Figure 3:
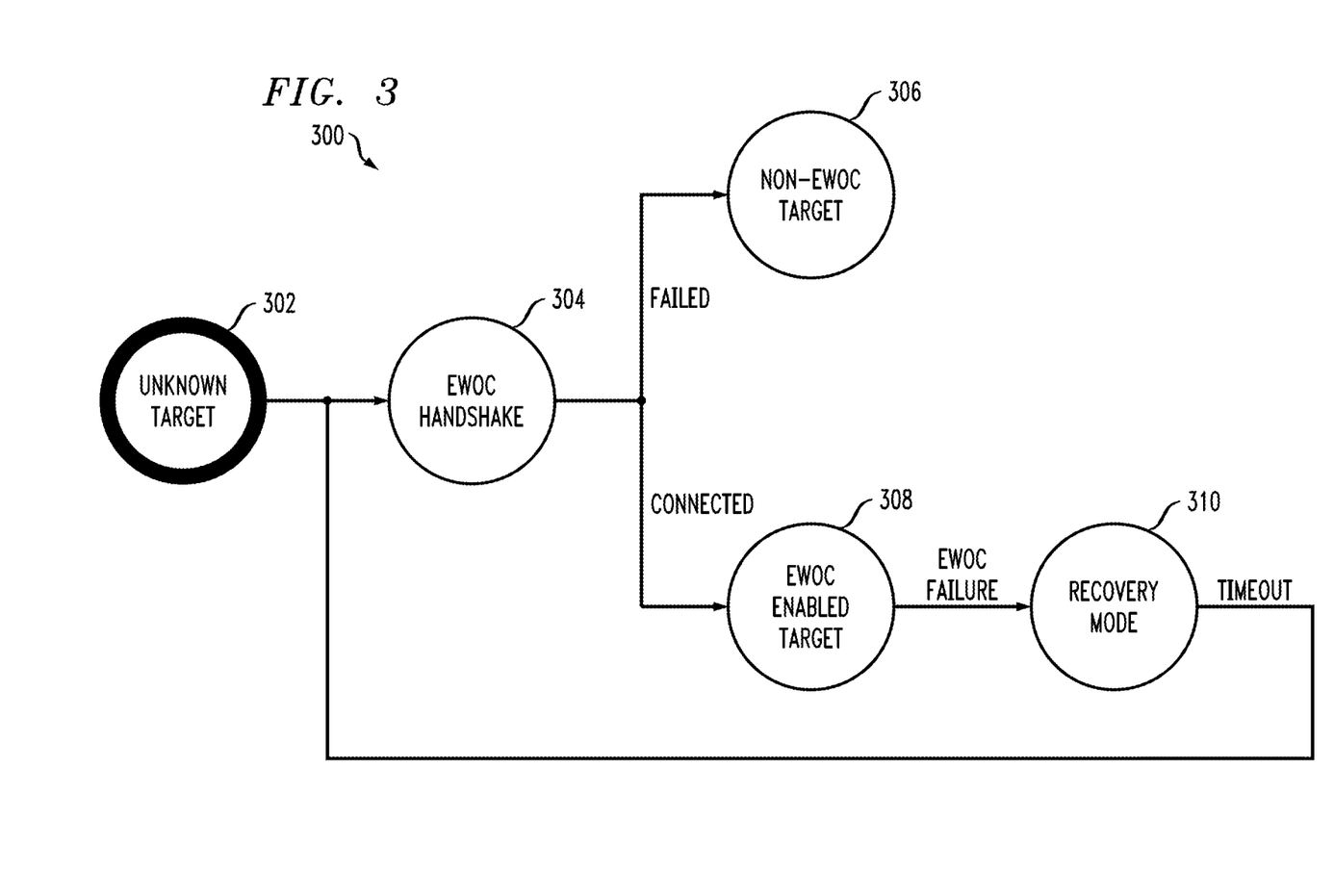
FIG. 3 is a flow chart illustrating an exemplary methodology for a handshake between counterpart agents, in accordance with an embodiment of the present invention.

FIG. 3 is a flow chart illustrating an exemplary methodology 300 for handshake recognition between counterpart agents 116. An unknown target 302 engages in EWOC handshake 304 to determine the presence of optimization agents 116, such as EWOC agents, on both sides of a transmission. If it is determined in the EWOC handshake 304 that an EWOC agent 116 is missing on one or both sides, the EWOC connection fails and the unknown target 302 is classified as a non-EWOC target 306. The transmission proceeds by standard protocol 101. If, however, it is determined in the EWOC handshake 304 that EWOC agents 116 are present on both sides, the unknown target 302 is classified as an EWOC-enabled target 308 and a tunnel connection is made to the EWOC enabled target 308. If the established EWOC tunnel connection fails after it has been established, the communication goes into a recovery mode 310, and after a predefined timeout period program control returns to the EWOC handshake 304 to re-initiate the connection.

Figure 4:
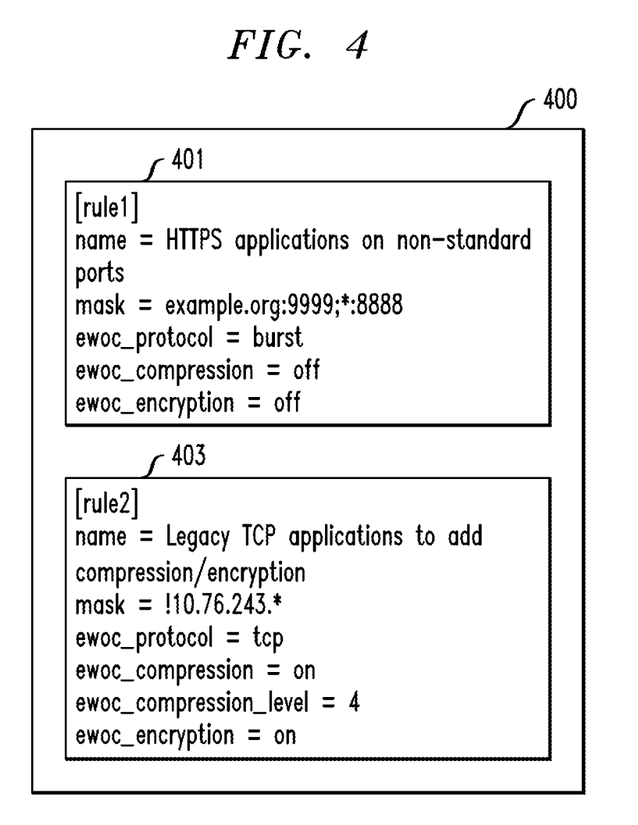
FIG. 4 illustrates exemplary rules for intercepting and transmitting data in accordance with an embodiment of the present invention.

FIG. 4 is a table 400 illustrating exemplary configurable criteria for intercepting and transferring at least one data packet from a sender to a receiver. As shown in FIG. 4, exemplary criteria for intercepting at least one data packet includes, but is not limited to, the application name, port type, source or destination IP address, and mask, or some combination thereof. Exemplary criteria for transferring intercepted packets includes, but is not limited to, data deduplication, transfer protocol, compression, compression level, and encryption, or some combination thereof.

In the example of FIG. 4, criteria 401 contains rule 1, which is configured to intercept packets with application names that are HTTPS applications on non-standard ports and with a mask that satisfies the expression "example.org:9999;*8888". Criteria 401 is further configured such that the EWOC transmission protocol is BURST, EWOC compression is turned off, and EWOC encryption is turned off.

In addition, criteria 403 contains rule 2, which is configured to intercept packets with application names that are legacy TCP applications that have been designated to add compression and/or encryption and with a mask that satisfies the expression "110.76.243.*". Criteria 403 is further configured such that the EWOC transmission protocol is TCP, EWOC compression is turned on, the EWOC compression level is set to 4, and EWOC encryption is turned on.

In an exemplary embodiment of the present invention, the criteria for intercepting packets and the criteria for transferring intercepted packets are configured in packet filters, such as network packet filters 106. These criteria may be user-configurable or determined by an application, for example.

In one particular use case, an iRODS (integrated Rule-Oriented Data System) data management platform is used at a genome research organization. In an environment using standard techniques for data transfer, upload, download, and replication of genomic data is relatively slow. Although iRODS is open source software and can be modified without approval of its owners, the modification seems impractical as modified software would not have community support. A solution that does not require application modification is more preferable from a maintenance point of view. In this case, the disclosed techniques can be employed to improve and/or optimize data transfer and enhance iRODS, without requiring modification of the application.

In an alternative use case, a web-based application seeks to transfer large amounts of data. Even if the application can be modified, underlying transport layers cannot be modified and implemented at both the web browser and application server. Advantageously, the disclosed techniques can be implemented to increase data transfer speed and/or security in a manner that is transparent to the web browser and application server.

In yet another use case, a mobile application is data intensive, particularly with media content, such as photos and videos. Typically, mobile applications do not allow for control over sources that would enable optimization of uploading and download speeds. Advantageously, the disclosed methods may be used to improve and/or optimize the channel without modifying the mobile application.

CONCLUSION

The foregoing applications and associated embodiments should be considered as illustrative only, and numerous other embodiments can be configured using the techniques disclosed herein, in a wide variety of different data transfer applications.

It should also be understood that the data transmission techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The data transfer system may be implemented using one or more processing platforms. One or more of the processing modules or other components may therefore each run on a computer, storage device or other processing platform element. A given such element may be viewed as an example of what is more generally referred to herein as a "processing device."

Figure 5:
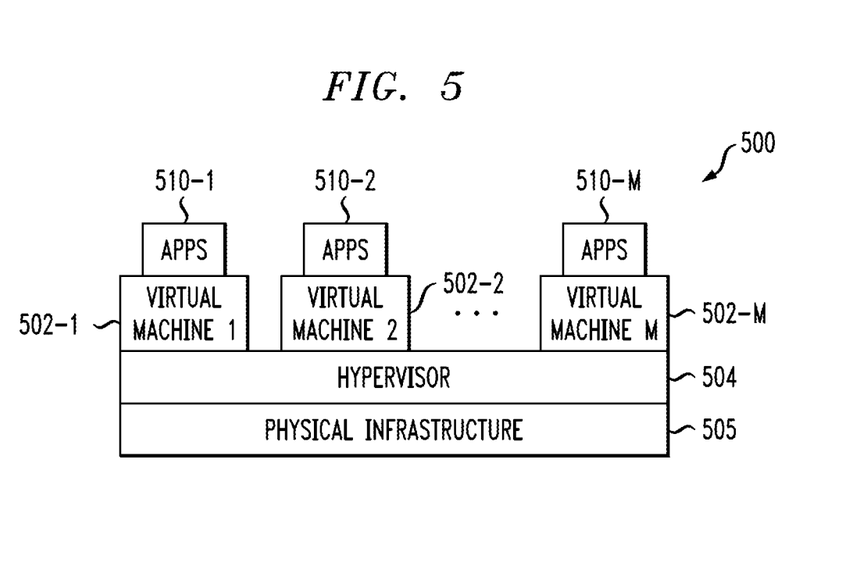
FIG. 5 illustrates an exemplary processing platform that may be used to implement at least a portion of one or more embodiments of the present invention comprising a cloud infrastructure.

Referring now to FIG. 5, one possible processing platform that may be used to implement at least a portion of one or more embodiments of the invention comprises cloud infrastructure 500. The cloud infrastructure 500 in this exemplary processing platform comprises virtual machines (VMs) 502-1, 502-2, . . . 502-M implemented using a hypervisor 504. The hypervisor 504 runs on physical infrastructure 505. The cloud infrastructure 500 further comprises sets of applications 510-1, 510-2, . . . 510-M running on respective ones of the virtual machines 502-1, 502-2, . . . 502-M under the control of the hypervisor 504.

The cloud infrastructure 500 may encompass the entire given system or only portions of that given system, such as one or more of client, servers, controller, authentication server or relying server in the system.

Although only a single hypervisor 504 is shown in the embodiment of FIG. 5, the system may of course include multiple hypervisors each providing a set of virtual machines using at least one underlying physical machine.

An example of a commercially available hypervisor platform that may be used to implement hypervisor 504 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of one or more nodes 102, 104, although in other embodiments a given tenant can have multiple containers. The containers may be utilized to implement a variety of different types of functionality within one or more nodes 102, 104. For example, containers can be used to implement respective compute nodes or cloud storage nodes of a cloud computing and storage system. The compute nodes or metadata servers may be associated with respective cloud tenants of a multi-tenant environment of one or more nodes 102, 104. Containers may be used in combination with other virtualization infrastructure such as virtual machines implemented using a hypervisor.

Figure 6:
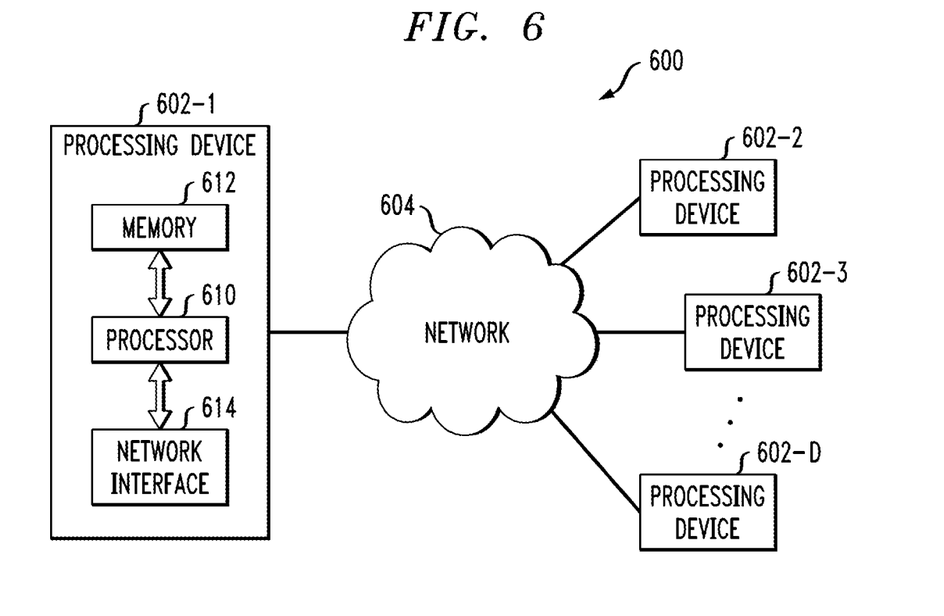
FIG. 6 illustrates another exemplary processing platform that may be used to implement at least a portion of one or more embodiments of the present invention.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-D, which communicate with one another over a network 604. The network 604 may comprise any type of network, such as a WAN, a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "computer program product" having executable computer program code embodied therein, may comprise random access memory (RAM), read only memory (ROM) or other types of memory, in any combination.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 5 or 6, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of communication devices that can benefit from the data transmission techniques disclosed herein. Also, the particular configuration of communication devices and processing device elements shown herein, and the associated data transmission techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   obtaining data for transfer over a network from a sender to a receiver using a first transfer protocol;
   intercepting, at an operating system level, at least one packet of said data that satisfies one or more first configurable criteria;
   establishing a tunnel from said sender to said receiver, wherein said tunnel (i) uses a second transfer protocol to transfer the at least one intercepted packet, wherein the second transfer protocol is distinct from the first transfer protocol, and (ii) selectively performs one or more of encryption, compression, and data deduplication of said at least one intercepted packet in response to said at least one intercepted packet satisfying one or more second configurable criteria, wherein said one or more first configurable criteria is distinct from said one or more second configurable criteria; and transmitting said at least one intercepted packet through said tunnel from said sender to said receiver;
wherein the method is performed by at least one processing device coupled to a memory.

2. The method of claim 1, wherein packets from said data are transmitted through said tunnel and wherein said tunnel is maintained for the duration of said transfer.

3. The method of claim 1, wherein said sender and said receiver comprise a client and a server, respectively.

4. The method of claim 1, further comprising a first agent located at said sender and a second agent located at said receiver to establish and maintain the tunnel.

5. The method of claim 4, further comprising determining the presence of both said first agent and said second agent using a handshake protocol.

6. The method of claim 5, wherein said handshake protocol fails if said first agent or said second agent is not present, and wherein said transfer is carried out over a communication channel when said handshake protocol fails.

7. The method of claim 1, wherein said performing one or more of encryption, compression, and data deduplication is user-selected and configured in a network packet filter.

8. The method of claim 1, wherein an application selectively enables said one or more of said encryption, said compression, and said data deduplication using a library.

9. The method of claim 1, wherein said first configurable criteria for intercepting packets comprise one or more of a given transmission protocol port, a given source Internet Protocol (IP) address, a given destination IP address, a given encryption type, a given mask, and a given application type.

10. The method of claim 1, wherein said intercepting is transparent to an application server and does not require a modification of an application.

11. The method of claim 1, wherein said tunnel utilizes a User Datagram Protocol transport protocol utilizing burst transfers for wide area network data transfers.

12. A system, comprising:
a memory; and
at least one processing device, coupled to the memory, operative to:
obtain data for transfer over a network from a sender to a receiver using a first transfer protocol;
intercept, at an operating system level, at least one packet of said data that satisfies one or more first configurable criteria;
establish a tunnel from said sender to said receiver, wherein said tunnel (i) uses a second transfer protocol to transfer the at least one intercepted packet, wherein the second transfer protocol is distinct from the first transfer protocol, and (ii) selectively performs one or more of encryption, compression, and data deduplication of said at least one intercepted packet in response to said at least one intercepted packet satisfying one or more second configurable criteria, wherein said one or more first configurable criteria is distinct from said one or more second configurable criteria; and
transmit said at least one intercepted packet through said tunnel from said sender to said receiver.

13. The system of claim 12, wherein packets from said data are transmitted through said tunnel and wherein said tunnel is maintained for the duration of said transfer.

14. The system of claim 12, further comprising a first agent located at said sender and a second agent located at said receiver to establish and maintain the tunnel.

15. The system of claim 14, further comprising determining the presence of both said first agent and said second agent using a handshake protocol.

16. The system of claim 15, wherein said handshake protocol fails if said first agent or said second agent is not present, and wherein said transfer is carried out over a communication channel when said handshake protocol fails.

17. An article of manufacture comprising a non-transitory machine readable recordable storage medium containing one or more programs, which when executed by at least one processing device, implement the steps of:
obtaining data for transfer over a network from a sender to a receiver using a first transfer protocol;
intercepting, at an operating system level, at least one packet of said data that satisfies one or more first configurable criteria;
establishing a tunnel from said sender to said receiver, wherein said tunnel (i) uses a second transfer protocol to transfer the at least one intercepted packet, wherein the second transfer protocol is distinct from the first transfer protocol, and (ii) selectively performs one or more of encryption, compression, and data deduplication of said at least one intercepted packet in response to said at least one intercepted packet satisfying one or more second configurable criteria, wherein said one or more first configurable criteria is distinct from said one or more second configurable criteria; and
transmitting said at least one intercepted packet through said tunnel from said sender to said receiver.

18. The article of manufacture of claim 17, wherein packets from said data are transmitted through said tunnel and wherein said tunnel is maintained for the duration of said transfer.

19. The article of manufacture of claim 17, further comprising a first agent located at said sender and a second agent located at said receiver to establish and maintain the tunnel and wherein said method further comprises determining the presence of both said first agent and said second agent using a handshake protocol.

20. The article of manufacture of claim 19, wherein said handshake protocol fails if said first agent or said second agent is not present, and wherein said transfer is carried out over a communication channel when said handshake protocol fails.

* * * * *